United States Patent [19]

Moulson et al.

[11] 4,409,344

[45] Oct. 11, 1983

[54] LOW SHRINK UNSATURATED POLYESTER RESINOUS COMPOSITION

[75] Inventors: Thomas J. Moulson; John E. Greenzweig, both of Minneapolis, Minn.

[73] Assignee: Cargill Incorporated, Minneapolis, Minn.

[21] Appl. No.: 276,478

[22] Filed: Jun. 23, 1981

Related U.S. Application Data

[63] Continuation-in-part of Ser. No. 138,660, Apr. 9, 1980, Pat. No. 4,298,711.

[51] Int. Cl.$^3$ .............................. C08K 3/04; C08K 3/08
[52] U.S. Cl. ...................................... 523/512; 523/500; 523/514; 523/521; 523/527; 524/425; 525/58; 525/422; 525/448
[58] Field of Search ............... 523/512, 514, 521, 527, 523/500; 525/58, 422, 448; 524/425

[56] References Cited

U.S. PATENT DOCUMENTS

| | | | |
|---|---|---|---|
| 3,657,387 | 4/1972 | Stahly et al. | 260/866 |
| 3,701,748 | 10/1972 | Kroekel | 260/40 |
| 3,772,241 | 11/1978 | Kroekel | 260/40 |
| 3,909,483 | 9/1975 | Hindersinn et al. | 523/514 |
| 3,922,247 | 11/1975 | Hazen et al. | 523/527 |
| 3,926,902 | 12/1975 | Bower | 523/512 |
| 3,989,655 | 11/1976 | Rudolph et al. | 260/16 |

OTHER PUBLICATIONS

Ashland Chemical Company, Division of Ashland Oil, Inc., Columbus, Ohio; Re Aropol TM 7020.

*Primary Examiner*—J. Ziegler
*Attorney, Agent, or Firm*—Fitch, Even, Tabin, Flannery & Welsh

[57] ABSTRACT

A low shrink unsaturated polyester based upon propylene glycol terephthalate reacted with a dibasic acid or anhydrides thereof and glycols and mixing the polyester with a filler, fibrous reinforcing agent and catalyst.

10 Claims, No Drawings

LOW SHRINK UNSATURATED POLYESTER RESINOUS COMPOSITION

This application is a continuation-in-part application of application Ser. No. 138,660 filed Apr. 9, 1980, issued as U.S. Pat. No. 4,298,711.

This invention relates to molding compositions capable of hardening with low shrinkage and based on unsaturated polyesters with high strength, high elongation, and high heat distortion temperatures. In the prior art low shrink unsaturated polyester resins have low strength, low elongation and high heat distortion temperatures. Typical press molding resins have high strength, high elongation, but low heat distortion temperatures. The resin provided by this invention is a low shrink resin having high strength, high elongation, and high heat distortion temperatures with desirable process or press cycle times.

Conventional polyester molding compositions show considerable polymerization shrinkage which seriously affects the production of moldings with faultless surface qualities. It is known that polyester molding compositions to which certain low shrink additives are added before hardening, can be hardened with low shrinkage. Generally, these low shrink compositions or resins are reinforced with glass fiber or other fiberous reinforcements. Fillers, catalysts, mold releases and pigments are used with such polyester compositions as is known in the art.

In the prior art, typical low shrink additives with unsaturated polyester resins are either styrenated sirups or solids. The styrenated sirups include both acidified and non-acidified poly(methyl methacrylate/ethyl acrylate), poly(vinyl acetate), polystyrene, cellulose acetate butyrate, polycaprolactones, and saturated polyesters, etc. These are usually dissolved at about 30–40% by weight in styrene. Solid additives include polyethylene and poly(vinyl chloride). On solids, the total amount of low shrink additive in the system is about 5 to 20 parts by weight compared to 85 to 95 parts by weight of styrene and unsaturated polyester solids combined. The 100 parts of polyester, styrene and additive are usually referred to as "resin".

Conventional low shrink resins in the prior art have low strength, low elongation and high heat distortion temperatures. Typical press molding resins have high strength, high elongation, but low heat distortion temperatures. It is the object of this invention to have a a low shrink unsaturated polyester resin for fabrication of fibrous reinforced articles by compression, injection or transfer molding with high strength to meet the requirements of a general press resin, together with high elongation and high heat distortion temperatures.

Accordingly, the invention provides a low shrink unsaturated polyester resinous composition for molding articles wherein the resin is a product of (a) a mixture of 25-35 parts of maleic acid, fumaric acid, their anhydrides and mixtures thereof, 5–25 parts of isophthalic acid, phthalic acid, their anhydrides and mixtures thereof, 10–40 parts propylene glycol, from about 10-30 parts dipropylene glycol and from 5–30 parts propylene glycol terephthalate, said parts being parts by weight based on the total weight of the components;

(b) heating the mixture at about 420° F. with the addition of an inhibitor until a neat resin is formed with an acid number of 5-50; and (c) diluting the neat resin with 25–100 parts by weight of styrene and/or vinyl toluene.

The resulting polyester resinous composition or neat resin may be compounded into a molding compound when mixed with fillers, fibrous reinforcing agents, pigments, and release agents.

Fillers usually comprise limestone, alumina trihydrate, clay, talc, silicas, wollastonite, alumina, barytes, kaolin clay and gypsum. The two most common are limestone and alumina trihydrate. The latter is essential for good electrical and nonburning properties. The former is preferred when alumina trihydrate is not needed since it is cheaper, flows better, gives better surfaces and stronger molded parts. The filler comprises from about 20 to about 70 percent by weight of the molding compound. Silane coupling agents may be utilized with such fillers in accordance with conventional practice.

Reinforcements usually are glass fibers, from ⅛ inch to 2 inches in length, and comprise from about 10% by weight to about 75% by weight of a molding compound. Other reinforcements include textile fibers, polyimide fibers, poly(vinyl alcohol) fibers, boron fibers, graphite fibers, polyester fibers and the like as is known in the art.

Catalysts-initiators are usually heat decomposed. Tertiary-butyl perbenzoate is the most common, but by no means the only one. Catalysts are usually peroxides such as per(oxy)esters and per(oxy)ketals, but can be azo compounds. The latter catalysts include benzoyl peroxide, t-butyl peroctoate and azo bis isobutyronitrile. The list is far from being all inclusive and others as are known in the art are catalyst-initiators.

Mold releases include stearate soaps and other compounds as are known in the art. Zinc stearate and calcium stearate are often used.

Processing the molding compound can be done by the usual bulk sheet or thick molding compound methods. Molding is usually done between 300–1500 psi at 250°–325° F. Compression, transfer and injection techniques may be used. In accordance with this invention, a polyester resinous composition is provided by mixing 5 to 30 parts by weight propylene glycol terephthalate with 25 to 35 parts by weight, maleic or fumaric acid or anhydride and 15–25 parts by weight of isophthalic or phthalic acid or anhydride with a glycol or mixture of glycols such as 10 to 40 parts propylene glycol, 10 to 30 parts by weight dipropylene glycol, heating the mixture with an inhibitor until reaching an acid number from 5 to 50. The resulting neat resin is diluted with 25 to 100 parts by weight of styrene or vinyl toluene producing a viscosity of 100–5000 centipoises. The resin can be used as a molding compound when mixed with an initiator-catalyst, filler, reinforcement compound, and a mold release agent.

The following examples are provided to illustrate the invention more fully; however, they should not be construed as limiting the scope of the invention, many variations of which are contemplated.

EXAMPLE I 29.9 parts by weight maleic anhydride,
17.5 parts by weight phthalic anhydride,
18.6 parts by weight propylene glycol,
20.0 parts by weight dipropylene glycol, and
14.0 parts by weight propylene glycol terephthalate containing 10 mole percent excess propylene glycol over that required for complete esterification of the terephthalic acid groups;
are charged into a condensation reactor and heated to 420° F. with the addition of 50 ppm of parabenzoquinone, based on weight of materials charged into the reactor, until reaching an acid number of 29. From the original 100 parts, about 92 remain, the remaining 8 parts being converted to water. The resulting neat resin (92 parts) is diluted with 33 parts of styrene, and 100 ppm of hydroquinone based on the total weight of diluted resin composition. The resulting resin has a viscosity of about 800 centipoises. The indicated amounts are in parts by weight.

Clear castings of the above resin made with 1% benzoyl peroxide to 100 parts by weight resin cured at 70° C. for 1 hour and postcured at 121° C. for 2 hours have the following physical characteristics at 75°:

|  | 75° F. |
|---|---|
| Barcol Hardness (Impressor #934-1) | 46 |
| Tensile Strength/1000 lb. in.$^{-2}$ | 9.0 |
| Tensile Modulus/1000 lb. in.$^{-2}$ | 520 |
| Elongation at Break/% | 1.9 |
| Flexural Strength/1000 lb. in.$^{-2}$ | 16.0 |
| Flexural Modulus/1000 lb. in.$^{-2}$ | 520 |
| Heat Distortion Temperature/°C. at 264 psi | 120 |

EXAMPLE II

The above resin is made into a molding compound and molded by adding to 3500 grams of the resin of Example I,
19.15 grams of tertiary butyl perbenzoate,
19.25 grams of tertiary butyl peroctoate,
238 grams of zinc stearate,
87.5 grams of fine polyethylene powder,
1750 grams of finely ground limestone, (Vicron 31-6 a product of Pfizer),
4375 grams of finely ground alumina trihydrate (C-330 a product of Alcoa),
88 grams of pigment dispersion, and
140 grams of a magnesium oxide dispersion sold under the trademark Modifier M.

The above components are mixed on a Cowles type mixer until well stirred and homogeneous. Chopped fiberglass roving of one inch lengths (Owens-Corning 433 roving) is added into the above mix loading to 15% by weight and is compounded into the mixture in accordance with conventional sheet molding procedures. The resulting polyester glass compound is molded for one minute at 300° F. at 35 mil thickness at 1000 psi, and for 2 minutes of 100 mil thickness at 1000 psi.

The linear shrinkage of the cold molded part to cold mold is 0.4 mil/inch.

EXAMPLE III

The resin of Example I may be made into a molding compound having the following composition with a fiberglass content of 44% by weight with the following components being mixed as in Example II.

| Component | Parts by Weight |
|---|---|
| Resin of Example I | 100 |
| CaCO$_3$ (Camel-Wite) | 100 |
| Zinc stearate (Mallinckrodt TG Dense) | 4 |
| t-Butyl perbenzoate | 1 |
| MgO(40% dispersion sold as Plastigel 9033 by Plastic Colors, Ashtabula, Ohio) | 1.25 |

Fiberglass roving of one inch lengths was compounded into the above paste at 44% by weight loading based upon total weight of the compound in accordance with conventional sheet molding procedures. The resulting polyester glass compound after molding at 300° F. for 2 minutes at 1000 psi yields a molded composite with the following physical properties:

| Tensile strength/1000 lb. in.$^{-2}$ | 19.58 |
|---|---|
| Tensile modulus/1000 lb. in.$^{-2}$ | 2350.00 |
| Elongation at Break/% | 1.53 |
| Flexural Strength/1000 lb. in.$^{-2}$ | 46.10 |
| Flexural modulus/1000 lb. in.$^{-2}$ | 2110.00 |
| DTUFL (264 lb. in.$^{-2}$)/°F. | >400.00 |
| Notched Izod/(ft. lb./in. notch) | 21.30 |

EXAMPLE IV

The resin of Example I may be made into molding compounds having the following compositions with a fiberglass roving content of 27% by weight with the following components being mixed as in Example II.

| | Compositions | | |
|---|---|---|---|
| Component | A | B | C |
| Resin of Example I | 70 | 85 | 92 |
| Low profile low shrink polyvinyl acetate, LP-40A, a product of Union Carbide Corp. | 30 | — | — |
| Aluminia trihydrate, Alcoa C-331, a product of Alcoa Chemicals | 125 | 125 | — |
| CaCO$_3$ (Camel-Wite) | — | 25 | 150 |
| Zinc stearate (Mallinkrodt IG Dense) | 4 | 3 | 3 |
| t-Butyl perbenzoate | 1 | 1 | 1 |
| Ground polyethylene low shrink additive, Microthene FN-510, a product of USI Chemicals | — | 15 | 8 |

Fiberglass roving of one inch lengths was compounded into each respective paste (A, B, and C) described above to 27% by weight loading in each paste in accordance with conventional sheet molding procedures. The resulting polyester glass compounds after molding at 300° F. for 2 minutes at 1000 psi yield molded composites with the following physical properties.

| | A | B | C | ASTM Test Used |
|---|---|---|---|---|
| Tensile Strength/ 1000 lb. in.$^{-2}$ | 10.00 | 9.50 | 10.00 | D-638 |
| Tensile Modulus/ 10$^6$ lb. in.$^{-2}$ | 1.45 | 1.35 | 1.55 | D-638 |
| Elongation at Break/% | 1.40 | 1.50 | 1.60 | D-638 |
| Flexural Strength/ 1000 lb. in.$^{-2}$ | 20.00 | 25.00 | 22.00 | D-790 |
| Flexural Modulus/ 10$^6$ lb. in.$^{-2}$ | 1.37 | 1.45 | 1.63 | D-790 |
| DTUFL at 264 lb. in.$^{-2}$/°F. | >400 | >400 | >400 | D-648 |
| Notched Izod/ | 14.00 | 13.00 | 12.50 | D-256 |

-continued

|  | A | B | C | ASTM Test Used |
|---|---|---|---|---|
| (ft. lb./in. notch) Shrinkage/(mil/in.) Cold part to Cold mold (expansion) | 0.00 | 0.88 | 1.38 | |

While the invention has been illustrated by the foregoing examples, it is understood that various modifications are contemplated and may be made within the scope of the invention, as defined in the following claims.

What is claimed is:

1. A molding compound containing fibrous reinforcement comprising:
   (a) a low shrink polyester which is a product of a mixture of
   (i) from about 25 to about 35 parts by weight of a member selected from the group consisting of maleic acid, fumaric acid, their anhydrides and mixtures thereof;
   from about 5 to about 25 parts by weight of a member selected from the group consisting of isophthalic acid, phthalic acid, their anhydrides, and mixtures thereof;
   from about 10 to about 40 parts by weight propylene glycol;
   from about 10 to about 30 parts by weight dipropylene glycol;
   from about 5 to about 30 parts by weight propylene glycol terephthalate;
   (ii) heating said mixture of about 420° F. until a neat resin is formed with an acid number of from about 5 to about 50; and
   (iii) diluting the neat resin with from about 25 to about 100 parts by weight of a member selected from the group consisting of styrene, vinyl toluene and mixtures thereof;
   (b) mixing said resin with a filler, fibrous reinforcing agent and catalyst-initiator.

2. A molding compound in accordance with claim 1 wherein said fibrous reinforcing agent comprises from about 10 to about 75 percent by weight of said molding compound.

3. A molding compound in accordance with claims 1 or 2 wherein said filler comprises from about 20 to about 70 percent by weight of said molding compound.

4. A molding compound in accordance with claims 1 or 2 wherein said filler is selected from the group consisting of limestone, alumina trihydrate, talc, silica, wollastonite, alumina, barytes, gypsum, and kaolin clay.

5. A molding compound in accordance with claim 1 or 2 wherein said fibrous reinforcing agent is selected from the group consisting of glass fibers, boron fibers, graphite fibers, poly (vinyl alcohol) fibers, and polyimide fibers.

6. A molding compound in accordance with claim 1 wherein said catalyst initiator is selected from the group consisting of peroxides, azo compounds and mixtures thereof.

7. A molding compound in accordance with claim 1 wherein said catalyst initiator is selected from the group consisting of teritiary butyl perbenzoate, benzoyl peroxide, and azo bis isobutyronitrile.

8. An article molded from a molding compound in accordance with claim 1.

9. A molding compound in accordance with claim 1 or 2 wherein said fibrous reinforcing agent is textile fibers.

10. A molding compound in accordance with claim 9 wherein said textile fibers are polyester fibers.

* * * * *

UNITED STATES PATENT AND TRADEMARK OFFICE
CERTIFICATE OF CORRECTION

PATENT NO. : 4,409,344

DATED : October 11, 1983

INVENTOR(S) : Thomas J. Moulson et al.

It is certified that error appears in the above-identified patent and that said Letters Patent is hereby corrected as shown below:

Column 1, line 27, "fiberous" should read --fibrous--.

Column 3, line 52, change "of" to --at--.

Column 3, line 65, change "TG" to --IG--.

Column 4, line 40, change "Mallinkrodt" to --Mallinckrodt--.

Column 5, line 33, change "of" to --to--.

Signed and Sealed this

Twenty-third Day of April 1985

[SEAL]

Attest:

DONALD J. QUIGG

*Attesting Officer*     *Acting Commissioner of Patents and Trademarks*